United States Patent
Yao

(10) Patent No.: US 6,417,421 B1
(45) Date of Patent: Jul. 9, 2002

(54) HYDROCARBON CONVERSION CATALYST COMPOSITION AND PROCESS THEREFOR AND THEREWITH

(75) Inventor: Jianhua Yao, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/558,126

(22) Filed: Apr. 25, 2000

Related U.S. Application Data

(63) Continuation-in-part of application No. 09/034,051, filed on Mar. 3, 1998, now Pat. No. 6,074,975.

(51) Int. Cl.[7] ............................. C07C 5/22; C07C 4/02
(52) U.S. Cl. ................................... 585/418; 585/651
(58) Field of Search ........................... 502/64, 71, 77, 502/81, 84, 208, 214, 343; 585/418, 651, 655

(56) References Cited

U.S. PATENT DOCUMENTS

| | | | |
|---|---|---|---|
| 3,843,741 A | * 10/1974 | Yan | 260/673.5 |
| 3,890,218 A | 6/1975 | Morrison | 208/135 |
| 3,911,041 A | * 10/1975 | Kaeding et al. | 260/682 |
| 3,953,366 A | * 4/1976 | Morrison | 252/455 Z |
| 3,962,364 A | * 6/1976 | Young | 260/671 C |
| 3,972,832 A | 8/1976 | Butter et al. | 252/437 |
| 4,016,219 A | * 4/1977 | Kaeding | 260/672 T |
| 4,044,065 A | 8/1977 | Butter et al. | 260/677 R |
| 4,097,367 A | * 6/1978 | Haag et al. | 208/135 |
| 4,349,461 A | * 9/1982 | Chu et al. | 252/455 Z |
| 4,371,457 A | * 2/1983 | Chu | 252/437 |
| 4,384,155 A | 5/1983 | Chu | 585/466 |
| 4,456,780 A | * 6/1984 | Young | 585/475 |
| 4,543,347 A | * 9/1985 | Heyward et al. | 502/61 |
| 4,554,394 A | * 11/1985 | Forbus et al. | 585/474 |
| 4,579,993 A | * 4/1986 | Bowes et al. | 585/640 |
| 4,590,321 A | * 5/1986 | Chu | 585/415 |
| 4,665,251 A | * 5/1987 | Chu | 585/415 |
| 4,692,424 A | * 9/1987 | Le Van Mao | 502/68 |
| 4,724,271 A | * 2/1988 | Martindale et al. | 585/415 |
| 4,795,845 A | * 1/1989 | Martindale et al. | 585/415 |
| 4,804,801 A | 2/1989 | Yan | 585/407 |
| 4,822,941 A | * 4/1989 | Baillargeon et al. | 585/417 |
| 5,053,374 A | * 10/1991 | Absil et al. | 502/64 |
| 5,220,086 A | * 6/1993 | Rodewald | 585/407 |
| 5,348,643 A | * 9/1994 | Absil et al. | 208/114 |
| 5,776,852 A | 7/1998 | Wu et al. | 502/177 |
| 5,804,059 A | 9/1998 | Wu et al. | 208/135 |
| 5,827,422 A | 10/1998 | Drake et al. | 208/135 |
| 5,866,741 A | 2/1999 | Wu et al. | 585/475 |
| 5,866,742 A | 2/1999 | Wu et al. | 585/475 |
| 5,866,744 A | 2/1999 | Wu et al. | 585/486 |
| 5,883,033 A | 3/1999 | Drake et al. | 502/68 |
| 5,883,034 A | 3/1999 | Drake et al. | 502/68 |
| 5,895,828 A | * 4/1999 | Yao et al. | 585/418 |
| 5,898,089 A | * 4/1999 | Drake et al. | 585/418 |
| 5,905,051 A | * 5/1999 | Wu et al. | 502/60 |
| 5,905,179 A | * 5/1999 | Drake et al. | 585/418 |
| 5,932,777 A | * 8/1999 | Sughrue, II et al. | 585/322 |
| 5,990,032 A | * 11/1999 | Wu et al. | 502/71 |
| 6,040,257 A | * 3/2000 | Drake et al. | 502/64 |
| 6,063,975 A | * 5/2000 | Drake et al. | 585/418 |
| 6,083,865 A | * 7/2000 | Drake et al. | 502/68 |
| 6,114,268 A | * 9/2000 | Wu et al. | 502/74 |
| 6,124,515 A | * 9/2000 | Wu et al. | 585/418 |
| 6,156,689 A | * 12/2000 | Kimble et al. | 502/77 |
| 6,255,243 B1 | * 7/2001 | Drake et al. | 502/68 |

* cited by examiner

*Primary Examiner*—Steven P. Griffin
*Assistant Examiner*—Cam N. Nguyen
(74) *Attorney, Agent, or Firm*—Hsiang-ning Sun

(57) ABSTRACT

A catalyst composition, a process for producing the composition, and a hydrotreating process for converting a hydrocarbon stream such as, for example, gasoline, to olefins and $C_6$ to $C_8$ aromatic hydrocarbons such as toluene and xylenes are disclosed. The catalyst composition comprises a zeolite and a promoter. The process for producing the composition comprises the steps: (1) combining a zeolite with a promoter under a condition sufficient to incorporate the zeolite with the promoter to produce a first promoted zeolite; (2) incorporating the first promoted zeolite with a second promoter to produce a second promoted zeolite; and (3) heating the second promoted zeolite. The hydrotreating process comprises contacting a hydrocarbon stream with the catalyst composition under a condition sufficient to effect the conversion of a hydrocarbon to an olefin and a $C_6$ to $C_8$ aromatic hydrocarbon.

21 Claims, No Drawings

HYDROCARBON CONVERSION CATALYST COMPOSITION AND PROCESS THEREFOR AND THEREWITH

This application is a continuation-in-part of application Ser. No. 09/034,051 filed on Mar. 3, 1998, now U.S. Pat. No. 6,074,975, issued Jun. 13, 2000.

FIELD OF THE INVENTION

This invention relates to a composition which can be used for converting a hydrocarbon to a $C_6$ to $C_8$ aromatic hydrocarbon and an olefin, to a process for producing the composition, and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5$+ alkanes; lower alkanes such as methane, ethane, and propane; lower alkenes such as ethylene and propylene; $C_6$–$C_8$ aromatic hydrocarbons; and $C_9$+ aromatic compounds which contain 9 or more carbons per molecule. However, the conversion of relatively low value hydrocarbons such as those having 5–6 carbons per molecule to more valuable petrochemical products is not as high as one skilled in the art desires. Therefore, development of a catalyst and a process for converting hydrocarbons to the more valuable olefins and BTX and would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it enhances the production of olefins and BTX. Other objects and advantages will becomes more apparent as this invention is more fully disclosed hereinbelow.

According to a first embodiment of the present invention, a composition which can be used as a catalyst for converting a hydrocarbon or a hydrocarbon mixture to an olefin and a $C_6$ to $C_8$ aromatic hydrocarbon is provided. The composition comprises an acid-leached zeolite, and at least one metal or element selected from the group consisting of Group IA, Group IIA, Group IIIA, Group IVA, Group VA, Group IIB, Group IIIB, Group IVB, Group VIB, of the CAS version of the Periodic Table of the Elements, CRC Handbook of Chemistry and Elements, 74th edition, 1993–1994 (CRC Press, Boca Raton, Fla.), and combinations of two or more thereof.

According to a second embodiment of the present invention, a process which can be used for producing a catalyst composition is provided. The process comprises the steps: (1) optionally contacting a zeolite which can comprise a binder with steam whereby a steamed zeolite is formed; (2) optionally contacting a zeolite or the steamed zeolite with an acid in an amount and under a condition effective to produce an acid-leached zeolite; (3) combining a zeolite, which can also be the steamed zeolite or the acid-leached zeolite, with a first promoter under a condition sufficient to incorporate the zeolite with the first promoter to produce a first promoted zeolite; (4) optionally heat-treating the first promoter zeolite to produce a heat-treated, first promoted zeolite; (5) incorporating a second promoter into the first promoted zeolite to produce a second promoted zeolite; and (6) heat-treating the second promoted zeolite wherein the first promoter or the second promoter is a metal or compound selected from the group consisting of Group IA, Group IIA, Group IIIA, Group IVA, Group VA, Group IIB, Group IIIB, Group IVB, Group VIB, of the CAS version of the Periodic Table of the Elements, CRC Handbook of Chemistry and Elements, 74th edition, 1983–1994 (CRC Press, Boca Raton, Fla.), and combinations of two or more thereof.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a hydrocarbon or a hydrocarbon mixture with a catalyst composition, which can be the same as disclosed above in the first embodiment of the invention, under a condition effective to convert a hydrocarbon to an olefin and an aromatic hydrocarbon containing 6 to 8 carbon atoms per molecule wherein the production of the olefins and aromatic compounds is enhanced.

DETAILED DESCRIPTION OF THE INVENTION

According to the first embodiment of the present invention the weight ratio of binder to zeolite can be any ratio that can enhance the production of olefin and $C_6$–$C_8$ aromatic compounds from a hydrocarbon and can be in the range of from about 1:20 to about 20:1, preferably about 1:10 to about 10:1, and most preferably about 1:7 to about 5:1. The composition can also comprise, consist essentially of, or consist of, a zeolite, a binder, and at least two promoters selected from the group consisting of Group IA, Group IIA, Group IIIA, Group IVA, Group VA, Group IIB, Group IIIB, Group IVB, Group VIB, of the Periodic Table of the Elements, and combinations of two or more thereof. The term "promoter" refers to a compound, a metal, or an element that, when incorporated in a zeolite, can enhance olefin and $C_6$–$C_8$ aromatic hydrocarbon production in a hydrocarbon conversion process. The term "metal or element" used herein also includes a compound of the metal or element. For the interest of simplicity, any references to "metal" in the application, unless otherwise indicated, will include the elements listed above and a compound of any of the elements.

The weight ratio of each promoter to zeolite can be any ratio as long as the ratio can enhance the production of an olefin and a $C_6$–$C_8$ aromatic compound during a hydrocarbon conversion process. Generally, the ratio can be in the range of from about 0.001:1 to about 1:1, preferably about 0.003:1 to about 1:1, and most preferably 0.005:1 to 0.5:1. The weight ratio of one promoter to the other promoter can be in the range of from about 0.01:1 to about 1:0.01.

Any binders known to one skilled in the art for use with a zeolite are suitable for use herein. Examples of suitable binders include, but are not limited to, aluminas such as for example α-alumina and γ-alumina; silicas; alumina-silica; aluminum phosphate; aluminum chlorohydrate; clays such as kaolinite, halloysite, vermiculite, chlorite, attapulgite, smectite, montmorillonite, illite, saconite, sepiolite, palygorskite, and combinations of any two or more thereof; and combinations of two or more thereof. Because these binders are well known to one skilled in the art, description of which is omitted herein. The presently preferred binder, if employed, is alumina because it is readily available.

According to the present invention, any metals or compound containing a metal or element selected from the group consisting of Group IA, Group IIA, Group IIIA, Group IVA, Group VA, Group IIB, Group IIIB, Group IVB, Group VIB, of the Periodic Table of the Elements, and combinations of two or more thereof can be used as promoter. Illustrated hereinbelow are some examples of suitable promoters.

Any Group IIB metals or compounds which can, when incorporated into a zeolite, enhance a hydrocarbon conversion reaction can be used in the present invention. Examples of suitable Group IIB metals or compounds include, but are not limited to, zinc, zinc oxide, zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc nitrate, zinc sulfate, zinc halides, zinc phosphate, zinc acetate dihydrate, diethylzinc, zinc 2-ethylhexanoate, titanium zinc titanate, and combinations of two or more thereof.

Examples of suitable Group IVB metals or compounds include, but are not limited to, titanium, zirconium, hafnium, lanthanum, cerium, lanthanum titanate, titanium tetramides, titanium tetramercaptides, titanium chloride, titanium oxalate, zinc titanate, tetraisopropyl titanate, tetra-n-butyl titanate, tetrakis(2-ethylhexyl) titanate, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of two or more thereof.

Examples of suitable Group IIA metals or compounds include, but are not limited to, magnesium, magnesium oxide, magnesium silicate, magnesium nitrate, magnesium acetate, magnesium acetylacetoante, magnesium chloride, magnesium molybdate, magnesium hydroxide, magnesium sulfate, magnesium sulfide, magnesium titanate, magnesium tungstate, magnesium formate, magnesium bromide, magnesium bromide diethyl etherate, magnesium fluoride, dibutyl magnesium, magnesium methoxide, $Mg(OC_2H_5)_2$, $Mg(OSO_2CF_3)_2$, dipropyl magnesium, and combinations of two or more thereof.

Examples of Group IVA metals or compounds include, but are not limited to, silicon, silicon oxide, poly (phenylmethylsiloxane), poly(phenylethylsiloxane), poly (phenylpropylsiloxane), hexamethyldisiloxane, decamethyltetrasiloxane, diphenyltetramethyldisiloxane, tetraethyl orthosilicate, trimethylchlorosilane, chloromethyldimethylchlorosilane, N-trimethylsilylimidazole, N,O-bis(trimethylsilyl) acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, (3-(2-aminoethyl) aminopropyl) trimethoxysilane, cyanoethyltrimethoxysilane, aminopropyltriethoxysilane, phenyltrimethoxysilane, (3-chloropropyl)trimethoxysilane, (3-mercaptopropyl)trimethoxysilane, (3-glycidoxypropyl) trimethoxysilane, vinyltris(β-methoxyethoxy)silane, (γ-methacryloxypropyl)trimethoxysilane, vinylbenzyl cationic silane, (4-aminopropyl)triethoxysilane, (γ-(β-aminoethylamino)propyl) trimethoxysilane, (γ-glycidoxypropyl)trimethoxysilane, (β-(3,4-epoxycyclohexyl)ethyl) trimethoxysilane, (β-mercaptoethyl)trimethoxysilane, (γ-chloropropyl) trimethoxysilane, and combinations of any two or more thereof can also be employed.

Similarly, any Group VA metals or compounds that, when impregnated onto or incorporated into a zeolite are capable of enhancing hydrocarbon conversion can be used in the present invention. Examples of suitable Group VA metals or compounds include, but are not limited to, phosphorus, phosphorus oxide, phosphorus pentoxide, phosphorus oxychloride, phosphoric acid, $P(R)_3$, $P(OR)_3$, $P(O)(OR)_3$, trimethyl phosphate, triethyl phosphate, and tripropyl phosphate, $P(O)(R)_3$, phosphines $P(R)_3$, and combinations of any two or more thereof wherein each R can be the same or different and is independently selected from the group consisting of hydrogen, alkyl radicals, alkenyl radicals, aryl radicals, alkaryl radicals, aralkyl radicals, and combinations of any two or more thereof.

Suitable Group VIB metals or compounds include, but are not limited to, molybdenum chloride, molybdenum acetate, molybdenum fluoride, molybdenum oxychloride, molybdenum sulfide, ammonium heptamolybdate and combinations of two or more thereof.

Examples of suitable Group IIIB metals or compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, lanthanum titanate, and combinations of any two or more thereof.

Any commercially available zeolite which can catalyze the conversion of a hydrocarbon to an aromatic compound and an olefin can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). Optionally a zeolite can be steam—and/or acid—treated before using the present invention. The presently preferred zeolites are those having medium pore sizes and having the physical characteristics disclosed above. ZSM-5 and similar zeolites are particularly preferred because of their shape selectivity.

The composition of the present invention can be prepared by combining a zeolite, promoters, and a binder in the weight ratios or percent disclosed above under any conditions sufficient to effect the production of such a composition. However, it is preferred that the composition be produced by the process of the second embodiment of the present invention.

According to the present invention, a zeolite, preferably a ZSM-5 zeolite and a binder can be well mixed at about 15 to about 100° C. under atmospheric pressure, or any other pressure generally in a liquid such as water or a hydrocarbon, by any means known to one skilled in the art such as stirring, blending, kneading, or extrusion, following which the resulting mixture can be dried in air at a temperature in the range of from about 20 to about 800° C., for about 0.5 to about 50 hours under any pressures that accommodate the temperatures, preferably under atmospheric pressure. Thereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steam.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof.

Any methods known to one skilled in the art for treating a solid catalyst with an acid can be used in the acid treatment of the present invention. Generally, a zeolite, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 1 to about 20 hours, and most preferably 2 to 15 hours.

A zeolite, a calcined zeolite, or a calcined zeolite-binder mixture, can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite, with predominantly ammonium ions. Techniques for such treatment are well known to one skilled in the art such as, for example, ion exchange of the original ions. Ion exchange of exchangeable ions in a zeolite is well known to one skilled in the art, therefore, the description of which is omitted herein for the interest of brevity.

In the second embodiment of the invention, a zeolite or a zeolite-binder mixture, which could have been steamed and/or acid-leached, in a desired ionic form, regardless whether calcined or not, can be combined with a first promoter by the process disclosed above for producing zeolite-binder mixture to produce a first promoted zeolite. The first promoted zeolite can also be produced by contacting a zeolite with a promoter compound, in a solution or suspension, under a condition known to those skilled in the art to incorporate a promoter compound into a zeolite. Because the methods for incorporating or impregnating a promoter compound into a zeolite such as, for example, impregnation by incipient wetness method, are well known to those skilled in the art, the description of which is also omitted herein for the interest of brevity.

The first promoted zeolite can then be heat-treated under a condition to convert the first promoter compound to an oxide. Heat treatment can be steam or calcination at a temperature in the range of from about 300° C. to about 1,000° C., preferably about 400° C. to about 800° C., and most preferably 450° C. to 650° C. Thereafter, the first promoted zeolite or the heat-treated first promoted zeolite can be further incorporated or impregnated with a second promoter employing the same process disclosed above for the production of the first promoted zeolite or heat-treated first promoted zeolite to produce a second promoted zeolite or the composition of the invention. The first promoter can be a Group IIB metal or a Group VA metal.

The composition of the invention then can be, if desired, pretreated with a reducing agent before being used in a hydrocarbon conversion process for converting a hydrocarbon to an olefin and an aromatic hydrocarbon. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours. The treatment with a reducing agent can also be carried out in-situ in a reactor which is used for a hydrocarbon conversion process.

According to the third embodiment of the present invention, a process useful for converting a hydrocarbon or a hydrocarbon mixture to a mixture rich in olefins and $C_6$ to $C_8$ aromatic hydrocarbons comprises, consists essentially of, or consists of contacting a fluid stream comprising a hydrocarbon or hydrocarbon mixture which can comprise paraffins, olefins, naphthenes, and aromatic compounds with a catalyst composition under a condition sufficient to effect the conversion of a hydrocarbon mixture to a mixture rich in olefins and $C_6$ to $C_8$ aromatic hydrocarbons or to enhance the weight % of produced olefins (mainly ethylene and propylene) and $C_6$ to C8 aromatic hydrocarbons. The fluid stream can also comprise a diluent selected from the group consisting of carbon dioxide, nitrogen, helium, carbon monoxide, steam, hydrogen, an isoparaffin, and combinations of two or more thereof. The catalyst composition can be the same as that disclosed in the first embodiment of the invention and can be produced by the second embodiment of the invention. The weight ratio of the diluent to the hydrocarbon, if employed, can be in the range of from about 0.01:1 to about 100:1.

The term "fluid" is used herein to denote gas, liquid, vapor, or combinations thereof The term "hydrocarbon" is generally referred to, unless otherwise indicated, as one or more hydrocarbons having from about 2 carbon atoms to about 30 carbon atoms, preferably about 3 to about 20 carbon atoms, and most preferably 4 to 16 carbon atoms per molecule. Generally, a hydrocarbon contains at least one saturated hydrocarbon. The term "enhance or enhanced" refers to an increased weight percent of olefins and BTX in the product stream of a hydrocarbon conversion process employing the catalyst composition as compared to employing only a zeolite such as commercially available ZSM-5. Examples of a hydrocarbon include, but are not limited to butane, isobutane, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

Any fluid which contains a hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is naphthas or is derived from naphthas which generally contain more paraffins (alkanes) than combined content of olefins and aromatic compounds (if present).

The contacting of a fluid feed stream containing a hydrocarbon with the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include a weight hourly space velocity of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of catalyst composition of the invention.

A ZSM-5 zeolite obtained from UCI (United Catalysts, Inc., Louisville, Ky.) having a product designation of T-4480 (obtained as a 1/16 inch extrudate). Zeolite T-4480 contained about 30 percent by weight of alumina as binder.

T-4480 zeolite (150 g) was mixed with a hydrochloric acid solution containing 150 g of $H_2O$ and 165 g of concentrated HCl to form a mixture. The mixture was stirred at 90° C. for 2 hours followed by decantation to remove the solution and then by washing with distilled water. The resulting zeolite was then filtered and dried for 3 hours at 120° C. The dried zeolite was then calcined at 530° C. for 3 hours to produce an acid-leached (AL) zeolite (108.14 g). This procedure was repeated using fresh T-4480 for the preparation of other AL zeolite catalysts disclosed below. These batches of AL zeolite were pooled to produce AL zeolite.

The acid-leached T-4480 zeolite (20 g) was impregnated with a solution containing 4.68 g of triethylphosphate and 25 g of hexane to produce a phosphate-impregnated zeolite. The impregnation took about one hour at 25° C. The phosphate-impregnated zeolite was then heated to dryness on a hot plate followed by calcination at 540° C. for 3 hours in a muffle furnace to produce AL, P-promoted zeolite (catalyst A) containing 4 weight % phosphorus by calculation.

In another run, 20 g of the AL zeolite was impregnated with a solution containing 1 g of $Zn(NO_3)_2 \cdot 6H_2O$ and 40 ml of $H_2O$, using the procedure described above for producing AL, P-promoted zeolite, to produce acid-leached, Zn-promoted (AL-Zn) zeolite (catalyst B) containing 1 weight % zinc by calculation.

Also in another run, 5 g of catalyst A was further impregnated with a solution containing 0.25 g of $Zn(NO_3)_2 \cdot 6H_2O$ in 10 ml of $H_2O$. Following the procedure for drying and calcination described above, an acid-leached, P/Zn-promoted zeolite (catalyst C) was produced which contained 4 weight % P and 1 weight % Zn by calculation.

Further in another run, 10 g of catalyst B was further impregnated with 2.34 g of triethyl phosphate in 12 g of hexane using the impregnation, drying, and calcination procedure described above to produce an acid-leached, Zn/P-promoted zeolite (catalyst D) which contained 1% Zn and 4% P by calculation.

EXAMPLE II

This example illustrates the use of the catalyst compositions described in Example I as catalysts in the conversion of hydrocarbons to olefins and BTX.

A quartz reactor tube (inner diameter 1 centimeter; length 60 centimeter) was filled with a 20 centimeter bottom layer of Alundum® alumina (inert, low surface area alumina), 4.4 grams of one of the catalysts in the middle 20 centimeter of the tube, and a 20 centimeter top layer of Alundum® alumina. The liquid feed was a naphtha obtained from Phillips Petroleum Company, Bartlesville, Okla., and contained hydrocarbons. The liquid feed contained mainly hydrocarbons having 5 and 6 carbon atoms per molecule and is summarized as (liquid volume %): propane 0.036, butane 0.033, isobutane 0.069, pentane 0.714, isopentane 0.095, cyclopentane and 2,3-dimethylbutane 16.006, hexane 0.660, 2-methylpentane 54.273, 3-methylpentane 18.448, 2,2-dimethylbutane 9.053, methylcyclopentane 0.006, and heavies (molecular weight >99.74) 0.004. The feed was introduced into the reactor at a rate of 10.2 ml/hour (6.6 g/hour) with a $N_2$ cofeed at about 150 ml/minute. The reaction temperature was 550° C. The reactor effluent was cooled and separated into a gaseous phase and a liquid phase by passing through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly after the ice trap and analyzed on a Hewlett-Packard 5890 gas chromatograph using a HP-PLOT/$Al_2O_3$ column. The gas was also analyzed for hydrogen content on a Carle gas chromatograph using hydrocarbon trap followed by a 13X molecular sieve column. Both phases were analyzed by gas chromatographs at intervals of about 1 hour. The results of the runs at about 6 hours are shown in Table I below which illustrates the production of olefins and BTX from the feed disclosed above and individual catalyst compositions produced in Example I.

TABLE I

Olefins and BTX Production
(weight percent in product)

| | Product yield (wt %) | | | |
|---|---|---|---|---|
| Catalyst | $C_2^= + C_3^=$ | BTX | Total BTX and Olefins | Olefin / BTX |
| A (AL T-4480 + 4% P) | 23.8 | 0.9 | 24.7 | 26.4 |
| B (AL T-4480 + 1% Zn) | 2.0 | 58.7 | 60.7 | 0.034 |
| C (AL T-4480 + 4% P + 1% Zn) | 19.6 | 47.8 | 67.4 | 0.41 |
| D (AL T-4480 + 1% Zn + 4% P) | 32.8 | 16.4 | 49.2 | 2.0 |

The WHSV (weight hourly space velocity) of naphtha feed for each run was 1.5.

Table I shows that impregnation of an acid-leached zeolite with only phosphorus (catalyst A), the BTX yield was low at 0.9% and the total BTX and olefins yield was only 24.7%. Table I also shows that impregnation of the acid-leached zeolite with zinc (catalyst B) significantly enhanced the BTX yield at the expense of olefins yield. Table I additionally shows that sequential impregnation of the acid-leached zeolite with phosphorus followed by zinc significantly enhanced the production of olefins and BTX in the product stream (catalyst C). The results presented in Table I further demonstrate that an acid-leached zeolite sequentially impregnated with zinc followed by phosphorus (catalyst D) increased the ratio of olefins to BTX to as high as 2.0.

The results presented in Table I also demonstrate that a catalyst prepared by sequential impregnation of an acid-leached zeolite with phosphorus followed by zinc (catalyst C) provided an increased total weight percent of ethylene, propylene, and $C_6$ to $C_8$ aromatic hydrocarbons compared to a ZSM-5 containing only phosphorus (catalyst A), or a ZSM-5 containing only zinc (catalyst B), or a zinc-and-phosphorus-containing ZSM-5 prepared by adding zinc then phosphorus (catalyst D) when such catalyst was used to convert a hydrocarbon to ethylene, propylene, and $C_6$ to C8 aromatic hydrocarbons.

Results presented in Table I also demonstrate that a catalyst prepared by sequential impregnation of an acid-leached zeolite with zinc followed by phosphorus (catalyst D) provided an increased total weight percent of ethylene, propylene, and $C_6$ to $C_8$ aromatic hydrocarbons compared to a ZSM-5 containing only phosphorus (catalyst A) when such catalyst was used to convert a hydrocarbon to ethylene, propylene, and $C_6$ to $C_8$ aromatic hydrocarbons. Further, catalyst D produced an increased weight percent of ethylene and propylene when compared to a ZSM-5 containing only phosphorus (catalyst A), or a ZSM-5 containing only zinc (catalyst B), or a phosphorus-and-zinc-containing ZSM-5 prepared by adding phosphorus then zinc (catalyst C) when such catalyst was used to convert a hydrocarbon to ethylene, propylene, and $C_6$ to $C_8$ aromatic hydrocarbons.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a fluid which comprises a hydrocarbon with a catalyst under a condition to effect the conversion of a hydrocarbon to an olefin and a $C_6$ to $C_8$ aromatic hydrocarbon wherein said catalyst is produced by a process consisting essentially of the steps of:

(1) contacting an acid-leached ZSM-5 with a phosphorus compound selected from the group consisting of phosphorus oxide, phosphorus pentoxides, phosphorus oxychloride, phosphoric acid, phosphines, phosphites, phosphates, and combinations of two or more thereof to incorporate said phosphorus compound into said acid-leached ZSM-5 to produce a first promoted ZSM-5; (2) contacting said first promoted ZSM-5 with a second promoter to incorporate said second promoter into said first promoted ZSM-5 to produce a second promoted ZSM-5; and (3) heat-treating said second promoted ZSM-5 wherein said second promoter is a zinc compound selected from the group consisting of zinc nitrate, zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dihydrate, diethylzinc, zinc 2-ethylhexanoate, and combinations of two or more thereof; and further wherein said acid-leached ZSM-5 is a ZSM-5 having been suspended in an acid solution wherein said solution has a concentration of said ZSM-5 in said solution in the range of from about 0.01 to about 700 grams per liter, and further wherein said solution has an initial pH lower than about 6 and said solution is subjected to a treatment at a temperature in the range of about 70° C. to about 120° C. for 30 minutes to 20 hours at a pressure of about 1 atm.

2. A process according to claim 1 wherein said fluid is selected from the group consisting of gasolines from catalytic oil cracking processes, pyrolysis gasolines from thermal cracking of saturated hydrocarbons, naphthas, gas oils, reformates, and combinations thereof.

3. A process according to claim 1 wherein said fluid is naphtha.

4. A process according to claim 1 wherein said ZSM-5 is washed, dried, and calcined after said treatment.

5. A process according to claim 1 wherein said phosphorus compound is triethylphosphate.

6. A process according to claim 1 wherein said zinc compound is zinc nitrate.

7. A process according to claim 1 wherein said condition comprises: a weight hourly space velocity of said fluid in the range of about 0.01 to about 100 g feed/g catalyst/hour, a pressure in the range of about 0 to about 1000 psig, and a temperature in the range of about 250° C. to about 1000° C.

8. A process according to claim 1 wherein said catalyst provides an increased total weight percent of ethylene, propylene, and $C_6$ to $C_8$ aromatic hydrocarbons compared to a catalyst comprising ZSM-5 and only phosphorus, a catalyst comprising ZSM-5 and only zinc, or a catalyst comprising ZSM-5 and zinc-and-phosphorus prepared by adding zinc then phosphorus when said catalyst is used to convert a hydrocarbon to ethylene, propylene, and $C_6$ to $C_8$ aromatic hydrocarbon.

9. A process according to claim 1 wherein said catalyst provides an increased total weight percent of ethylene, propylene, and $C_6$ to $C_8$ aromatic hydrocarbons compared to a catalyst consisting essentially of ZSM-5 and phosphorus, a catalyst consisting essentially of ZSM-5 and zinc, or a catalyst consisting essentially of ZSM-5, zinc, and phosphorus prepared by adding zinc then phosphorus when said catalyst is used to convert a hydrocarbon to ethylene, propylene, and $C_6$ to $C_8$ aromatic hydrocarbon.

10. A process comprising contacting a fluid which comprises a hydrocarbon with a catalyst under a condition to effect the conversion of a hydrocarbon to an olefin and a $C_6$ to $C_8$ aromatic hydrocarbon wherein said catalyst is produced by a process consisting essentially of the steps of:

(1) contacting an acid-leached ZSM-5 with a zinc compound selected from the group consisting of zinc nitrate, zinc titanate, zinc silicate, zinc borate, zinc fluorosilicate, zinc fluorotitanate, zinc molybdate, zinc chromate, zinc tungstate, zinc zirconate, zinc thromite, zinc aluminate, zinc phosphate, zinc acetate dihydrate, diethylzinc, zinc 2-ethylhexanoate, and combinations thereof to incorporate said zinc compound into said acid-leached ZSM-5 to produce a first promoted ZSM-5; (2) contacting said first promoted ZSM-5 with a second promoter compound to incorporate said second promoter compound into said first promoted ZSM-5 to produce a second promoted ZSM-5; and (3) heat-treating said second promoted ZSM-5 wherein said second promoter compound is a phosphorus compound selected from the group consisting of phosphorus oxide, phosphorus pentoxides, phosphorus oxychloride, phosphoric acid, phosphines, phosphates, phosphates, and combinations thereof, wherein said acid-leached ZSM-5 is a ZSM-5 having been suspended in an acid solution to reduce aluminum-content in the ZSM-5.

11. A process according to claim 10 wherein said fluid is selected from the group consisting of gasolines from catalytic oil cracking processes, pyrolysis gasolines from thermal cracking of saturated hydrocarbons, naphthas, gas oils, reformates, and combinations thereof.

12. A process according to claim 10 wherein said fluid is naphtha.

13. A process according to claim 10 wherein said acid-leached ZSM-5 is a ZSM-5 having been suspended in an acid solution wherein said solution has a concentration of said ZSM-5 in said solution in the range of from about 0.01 to about 700 grams per liter, and further wherein said solution has an initial pH lower than about 6 and said solution is subjected to a treatment at a temperature in the range of about 70° C. to about 120° C. for 30 minutes to 20 hours at a pressure of about 1 atm.

14. A process according to claim 13 wherein said ZSM-5 is washed, dried, and calcined after said treatment.

15. A process according to claim 10 wherein said phosphorus compound is triethylphosphate.

16. A process according to claim 10 wherein said zinc compound is zinc nitrate.

17. A process according to claim 10 wherein said condition comprises: a weight hourly space velocity of said fluid in the range of about 0.01 to about 100 g feed/g catalyst/hour, a pressure in the range of about 0 to about 1000 psig, and a temperature in the range of about 250° C. to about 1000C.

18. A process according to claim 10 wherein said catalyst provides an increased total weight percent of ethylene, propylene, and $C_6$ to $C_8$ aromatic hydrocarbons compared to a catalyst comprising ZSM-5 and only phosphorus when said catalyst is used to convert a hydrocarbon to ethylene, propylene, and $C_6$ to $C_8$ aromatic hydrocarbon.

19. A process according to claim 10 wherein said catalyst provides an increased total weight percent of ethylene and propylene compared to a catalyst comprising ZSM-5 and only phosphorus, a catalyst comprising ZSM-5 and only zinc, or a catalyst comprising ZSM-5 and phosphorus and zinc prepared by adding phosphorus then zinc when said catalyst is used to convert a hydrocarbon to ethylene, propylene, and $C_6$ to $C_8$ aromatic hydrocarbon.

20. A process according to claim 10 wherein said catalyst provides an increased total weight percent of ethylene, propylene, and $C_6$ to $C_8$ aromatic hydrocarbons compared to a catalyst consisting essentially of ZSM-5 and phosphorus when said catalyst is used to convert a hydrocarbon to ethylene, propylene, and $C_6$ to $C_8$ aromatic hydrocarbon.

21. A process according to claim 10 wherein said catalyst provides an increased total weight percent of ethylene and propylene compared to a catalyst consisting essentially of ZSM-5 and phosphorus, a catalyst consisting essentially of ZSM-5 and zinc, or a catalyst consisting essentially of ZSM-5, phosphorus, and zinc prepared by adding phosphorus then zinc when said catalyst is used to convert a hydrocarbon to ethylene, propylene, and $C_6$ to $C_8$ aromatic hydrocarbon.

* * * * *